United States Patent [19]

Schmidt

[11] Patent Number: 4,849,045

[45] Date of Patent: Jul. 18, 1989

[54] EXTRUSION CASTING METHOD

[75] Inventor: Fred K. Schmidt, Titusville, N.J.

[73] Assignee: General Motors Corporation, Detroit, Mich.

[21] Appl. No.: 190,330

[22] Filed: May 5, 1988

[51] Int. Cl.[4] .................................................. B29C 47/02
[52] U.S. Cl. ..................... 156/244.24; 156/244.27; 156/246; 156/344; 264/132; 264/139; 264/171; 264/177.1; 264/177.17; 264/177.2; 264/178 R; 425/113
[58] Field of Search ..................... 264/171, 280, 177.1, 264/139, 284, 178 R, 177.17, 149, 568, 210.2; 425/71, 326.1, 113; 156/232, 244.24, 224.27, 246, 344

[56] References Cited

U.S. PATENT DOCUMENTS

| | | | |
|---|---|---|---|
| 3,811,989 | 5/1974 | Hearn | 264/177.17 |
| 3,843,475 | 10/1974 | Kent | 264/177.17 |
| 4,081,504 | 3/1978 | Wenrick et al. | 264/177.17 |
| 4,167,431 | 9/1979 | Wong | 264/178 R |
| 4,368,224 | 1/1983 | Jackson | 264/177.1 |
| 4,478,663 | 10/1984 | O'Sullivan | 264/284 |
| 4,698,193 | 10/1987 | Bernitz et al. | |

FOREIGN PATENT DOCUMENTS

| | | | |
|---|---|---|---|
| 2908487 | 9/1980 | Fed. Rep. of Germany | 264/568 |
| 57-14026 | 1/1982 | Japan | 264/210.2 |
| 57-207038 | 12/1982 | Japan | 264/151 |
| 57-207042 | 12/1982 | Japan | 264/284 |
| 58-116140 | 7/1983 | Japan | 264/139 |
| 60-99633 | 6/1985 | Japan | 264/177.1 |

Primary Examiner—Jeffery Thurlow
Attorney, Agent, or Firm—R. H. Tung

[57] ABSTRACT

A method of producing a profiled strip of polymeric material having a desirable surface finish on the outer periphery of the strip. The method comprising the steps of first extruding a profile strip of polymeric material through an extrusion die in a plastic extruder, laminating a sheet layer having a desirable surface finish on the surface facing the profiled strip to a predetermined area on the outer periphery of the profile strip and then cooling the profiled strip together with the laminated sheet layer such that the laminated sheet layer can be removed from the profiled strip to expose the desirable finish reproduced from the surface of the sheet layer.

6 Claims, 1 Drawing Sheet

EXTRUSION CASTING METHOD

FIELD OF THE INVENTION

This invention generally relates to a method of extruding a profiled strip of polymeric material and, more particularly, relates to a method of extruding a profiled strip of polymeric material and removably laminating a sheet layer having a desirable surface finish to cover a predetermined area on the outer periphery of the profiled strip such that the desirable surface finish can be reproduced on the surface area of the strip when the removably laminated sheet layer is removed before the final usage of the profiled strip.

BACKGROUND OF THE INVENTION

Profiled strips extruded of polymeric materials are widely used in automobile body applications as molding pieces. Molding pieces such as body side moldings or wheel well moldings are used to protect a vehicle body from impact damage and to protect edges of sheet metal panels from corrosion. Most of these molding pieces are extruded of thermoplastic materials such as PVC (polyvinyl chloride), thermoplastic rubber, thermoplastic urethane, or other flexible polymeric materials. PVC is one of the most widely used materials for its low cost and good physical properties.

Molding pieces such as a body side molding may be extruded of a plastic material alone or extruded in an extrusion coating process where plastic material is extruded on a metal reinforcing substrate. In an extrusion coating process where plastic material is combined with a more rigid metal substrate, a cross-head extrusion technique is used. In cross-head extrusion, a continuous length of metal reinforcing substrate is pulled through an extrusion die at 90° angle to the direction of the plastic flow while molten plastic material is being extruded onto the metal substrate. The metal reinforcing substrate is usually cleaned and dried through a multi-station process and formed by a series of metal roll formers prior to the entry into the extrusion die.

In automobile body parts, the aesthetic appearance of the part is one of the most important criteria that must be satisfied. In the extrusion of vinyl or vinyl/metal substrate reinforced molding pieces, the quality of the surface appearance of the molding pieces obtained is dependent upon many variables. For instance, these variables include the material composition, the extrusion temperature, the extrusion pressure, the extrusion rate, the cooling rate, etc. When a high gloss surface appearance is desired on a PVC molding piece, two common approaches are normally used. First, a high gloss PVC molding composition may be used to produce molding pieces having high gloss surface appearance. This can be achieved only at a substantial cost penalty since high gloss PVC compositioning normally cost substantially more than low gloss compositions. The other approach is to permanently laminate a high gloss film to the outer periphery of a molding strip. This approach also has its drawbacks. For instance, the cost of high gloss films is often prohibitive for the automobile designer to obtain high gloss appearance on a molding piece. Moreover, laminated molding pieces always have potential delamination problems, especially when the molding pieces are subjected to severe environmental exposures.

Minor irregularities in the extrusion conditions and in the quality of the plastic resin also cause surface imperfections in the molding pieces produced. These surface imperfections include the commonly known "pimples", "blow holes", "crows feet", "shock lines" and the "salt and pepper" appearance.

It is, therefore, an object of the present invention to provide a method of extrusion casting profiled strips of polymeric material having a desirable surface finish.

It is another object of the present invention to produce extruded profiled strips of polymeric material that have substantially no surface defects and imperfections.

It is a further object of the present invention to extrude profiled strips of polymeric material having high gloss surface appearance without using permanently laminated high gloss films.

SUMMARY OF THE INVENTION

The aforementioned objects can be achieved by the practice of my novel extrusion casting technique. In my extrusion casting technique, an extrudate, while still hot, is casted against a transfer sheet layer (i.e. a transfer film) having a desirable surface finish. The transfer sheet layer is then peeled off from the extrudate after both the transfer sheet layer and the extrudate are cooled.

In practice, a transfer film having a desirable surface finish is removably laminated onto the outer periphery of an extrudate at a short distance from the extrusion die. Both the extrudate, i.e. a profiled strip, and the laminated transfer film are then cooled in a cooling tank. After the transfer film is removed from the outer periphery of the profiled strip, a desirable surface finish reproduced from that of the transfer film is exposed.

By practicing my novel technique of extrusion casting, a variety of surface finishes can be reproduced on the outer periphery of profiled strips. These surface finishes include a high gloss appearance, a low gloss or mat appearance, and a variety of embossing patterns that can be made on the transfer sheet layer.

One of the important conditions that must be met in order to practice my novel invention is that the transfer sheet layer must be laminated onto the profiled strip while the surface of the profiled strip is still at a relatively high temperature. I have discovered that a minimum lamination temperature for PVC is approximately 220° F. This processing condition can be satisfied by rolling a transfer sheet layer onto a profiled strip at a short distance from the extrusion die, i.e. within a distance of approximately two feet.

I have also found that to facilitate easy removal of the transfer sheet layer from the profiled strip, a transfer sheet layer made of a dissimilar material from that of the profiled strip should be used. For example, when a PVC profiled strip is extruded, a transfer sheet layer of polyester material can be laminated onto the outer periphery of the profiled strip and then easily removed after cooling.

To further facilitate easy removal of the transfer sheet layer from the extruded profiled strip, both the sheet layer and the profiled strip need to be cooled substantially from the lamination temperature. A suitable temperature for cooling the sheet layer and the profiled strip to is approximately 120° F. for the polyester/PVC system.

BRIEF DESCRIPTION OF THE DRAWINGS

Further objects, features and advantages of this invention will become apparent from a consideration of the following description, the appended claims and the accompanying drawings in which brief description of the drawings:

DETAILED DESCRIPTION OF THE PREFERRED EMBODIMENT

Figure 1:
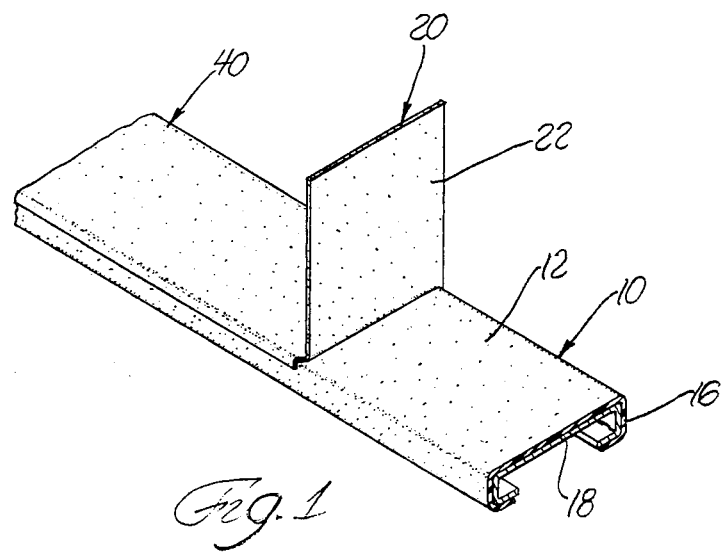
FIG. 1 is a perspective view of a section of a PVC profiled strip covered with a high gloss polyester film.

In my preferred embodiment, a PVC profiled strip is first made by extrusion coating a PVC resin composition onto a continuous length reinforcing metal substrate, a high gloss polyester film is then laminated on the top surface of the strip. A section of this PVC profiled strip 10 is shown in FIG. 1. It is seen in FIG. 1 that a layer of PVC material 16 having a thickness of approximately 0.020" is extruded on top of metal substrate 18. I have discovered that my novel extrusion casting technique can be practiced on a PVC thickness as small as 0.010". The metal substrate 18 used in my preferred embodiment is formed of aluminum material having sufficient thickness and rigidity suitable for use as an automobile body side molding.

FIG. 1 also shows a section of PVC profiled strip 40 covered with a high gloss polyester film 20, i.e. the transfer sheet layer. After polyester film 20 is peeled off top surface 12 of the profiled strip, as shown in the section of the strip marked by numeral 10, a high gloss finish on the PVC surface reproducing that on the bottom surface 22 of polyester film 20 is obtained.

Figure 2:
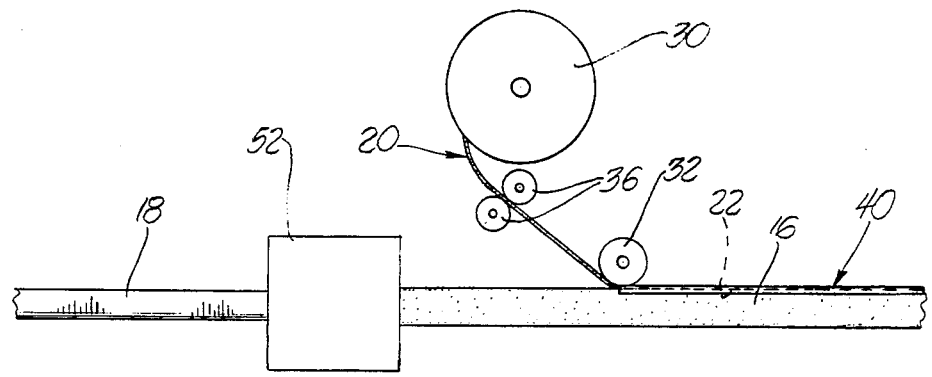
FIG. 2 is an illustration of the extrusion/lamination set-up.

A 2½" cross-head extruder is used in my preferred embodiment for extruding the PVC profiled strip in the extrusion coating process. A sketch of the set-up of the extrusion die and the lamination process is shown in FIG. 2. After reinforcing metal substrate 18 is cleaned and dried through a multi-station cleaning and drying process (not shown), it is preheated (not shown) and fed into cross-head die 52. After low gloss (i.e. 20° gloss reading of 60) PVC material 16 is extruded onto the reinforcing metal substrate 18, and while the surface temperature of the PVC material is still at a temperature of approximately 280° F. at a distance of approximately 2 feet from the extrusion die, a continuous length of a transfer sheet layer of high gloss polyester film 20 (having a 20° gloss reading of 90) is laminated onto PVC surface 16 by applicator roller 32 under a small rolling pressure sufficient to laminate. I have discovered that a minimum surface temperature of PVC required for lamination is 220° F. in order to reproduce the surface finish (i.e. 90 gloss) on the transfer sheet layer. This minimum surface temperature may be as low as 200° F. for some other type of plastics. It is seen in FIG. 2 that a continuous length polyester film 20 is fed from feed roll 30 through a set of roller guides 36 prior to being laminated to PVC surface 16.

The combined polyester film/PVC profiled strip 40 is then fed into a 20 feet long cooling water tank (not shown) to rapidly cool the PVC material and the polyester film. The water in the cooling tank is maintained at approximately 40° F. to rapidly cool the surface of the PVC profiled strip and to freeze in the 90 gloss finish that was reproduced from the surface of the polyester film. After the combined polyester film/PVC profiled strip left the cooling tank and blown dry by a high pressure air flow, it was cut to a suitable length by a circular saw mounted on a traveling table. I have found that my novel extrusion casting method can be practiced at a wide range of extrusion line speeds, i.e. from 5 feet/minute up to 100 feet/minute, while maintaining satisfactory results. The polyester film can be peeled off after the profiled strips are cut or it can be left on for surface protection until the part is used in final installation. By practicing my novel invention, the surface finish of the profiled strip was improved from a 60 gloss to a 90 gloss reproducing that of the polyester film.

The polyester film I have used in my preferred embodiment is a high gloss film, i.e. 90 gloss at 20° gloss reading by a Gardner Gloss Meter, of 0.001 inch thick. It was obtained from Pilcher Hamilton Corp. at Broadview, IL under the tradename of PHanex[R]. It is supplied in width between 1 to 4 inches. I have also used Tedlar[R] polyester film supplied by E.I. duPont Co. with equally satisfactory results. Both the PHanex[R] and Tedlar[R] films are available at several gloss levels.

Other types of films that are of different chemical nature may also be used to practice my invention to achieve the same desirable result. I have found that in certain films that are more rigid, preheating the film prior to lamination may be necessary in order to improve the flexibility of the film and thus facilitate the lamination process. The preheating process can be easily carried out by the use of a hot air gun to preheat the surface of the film to a temperature of approximately 300° F.

It would be desirable that the melting temperature (or softening temperature) of the transfer film material is at least 20° F. higher than the melting temperature (or softening temperature) of the material used to extrude the profiled strip. This would insure the easy removal of the transfer film from the profiled strip after both are cooled down from the lamination temperature.

It should also be noted that although a high gloss film was used in my preferred embodiment, any type of film with any type of finish or texture may be used in my novel invention. For instance, a low gloss (30 gloss on 20° gloss reading) polyester film may be used in the lamination process if a mat, non-glossy finish is desired on a PVC profile strip.

I have also used plastic films that have emboss patterns on their surfaces to reproduce the same emboss patterns on the surface of the profile strips. Even though such emboss patterns on a profiled strip may be achieved by the use of embossing rolls, my technique has the additional benefit of producing profiled strips with minimized surface imperfections.

By practicing my novel extrusion casting method, various surface imperfections frequently encounted in extruded profiled strips (i.e. pimples, blow holes, shock lines, etc.) can be substantially reduced or completely eliminated. Furthermore, no premium-priced high gloss films are required for permanent lamination when a high gloss finish is desired. My novel invention therefore produces premium-quality profiled strips at significantly lower cost.

The embodiments of the invention in which an exclusive property or privilege is claimed are defined as follows:

1. A method of using a plastic extruder equipped with an extrusion die to produce a profiled strip of polymeric material and removably laminating a sheet layer having a desirable surface finish to cover a predetermined area on the outer periphery of the profiled strip with the surface having said desirable finish facing said strip such that said desirable surface finish is reproduced on said surface area of said strip when said removably laminated sheet layer is removed prior to the final use of said profiled strip, said method comprising the steps of:

extruding a profiled strip of polymeric material through said extrusion die;

removably laminating a sheet layer having a desirable surface finish on the surface facing said profiled strip to a predetermined area on the outer periphery of said profiled strip, said sheet layer having a softening temperature at least 20° F. higher than the softening temperature of said polymeric material;

cooling said profiled strip together with said laminated sheet layer such that said laminated sheet layer can be removed from said profiled strip to expose said desirable surface finish reproduced from said sheet layer.

2. A method of using a plastic extruder equipped with an extrusion die to produce a profiled strip of polymeric material and removably laminating a sheet layer having a desirable surface finish to cover a predetermined area on the outer periphery of the profiled strip with the surface having said desirable finish facing said strip such that said desirable surface finish is reproduced on said surface area of said strip when said removably laminated sheet layer is removed prior to the final use of said profiled strip, said method comprising the steps of:

extruding a profiled strip of polymeric material through said extrusion die;

removably laminating a sheet layer having a desirable surface finish on the surface facing said profiled strip to a predetermined area on the outer periphery of said profiled strip while surface temperature of said strip is no less than 200° F., said sheet layer having a softening temperature at least 20° F. higher than the softening temperature of said polymeric material;

cooling said profiled strip together with said laminated sheet layer such that said laminated sheet layer can be removed from said profiled strip to expose said desirable surface finish reproduced from said sheet layer.

3. A method of using a plastic extruder equipped with an extrusion die to produce a profiled strip of polymeric material and removably laminating a sheet layer having a desirable surface finish to cover a predetermined area on the outer periphery of the profiled strip with the surface having said desirable finish facing said strip such that said desirable surface finish is reproduced on said surface area of said strip when said removably laminated sheet layer is removed prior to the final use of said profiled strip, said method comprising the steps of:

extruding a profiled strip of polymeric material through said extrusion die;

removably laminating a sheet layer having a desirable surface texture on the surface facing said profiled strip to a predetermined area on the outer periphery of said profiled strip while the temperature of said profiled strip is no less than 200° F., said sheet layer being made of a material dissimilar to that of the profiled strip such that no permanent bond occurs between said sheet layer and said profiled strip, and cooling said profiled strip together with said laminated sheet layer such that said laminated sheet layer can be removed from said profiled strip to expose said desirable surface finish reproduced from said sheet layer.

4. A method of using a plastic extruder equipped with an extrusion die to produce a profiled strip of polymeric material and removably laminating a sheet layer having a desirable surface finish to cover a predetermined area on the outer periphery of the profiled strip with the surface having said desirable finish facing said strip such that said desirable surface finish is reproduced on said surface area of said strip when said removably laminated sheet layer is removed prior to the final use of said profiled strip, said method comprising the steps of:

extruding a profiled strip of polymeric material through said extrusion die;

removably laminating a sheet layer having a desirable surface finish on the surface facing said profiled strip to a predetermined area on the outer periphery of said profiled strip while the surface temperature of said profiled strip is no less than 200° F., said sheet layer having a softening temperature at least 20° F. higher than the softening temperature of said polymeric material;

cooling said profiled strip together with said laminated sheet layer, and removing said laminated sheet layer from said profiled strip to expose said desirable surface finish on said profiled strip reproduced from said sheet layer.

5. In a method claimed in claim 1, said surface finish on said sheet layer being a high gloss finish having a 20° gloss reading of no less than 60.

6. In a method claimed in claim 4, said surface finish on said sheet layer being a high gloss finish having a 20 degree gloss reading of no less than 60.

* * * * *